(12) United States Patent
Sunkara et al.

(10) Patent No.: US 7,161,045 B1
(45) Date of Patent: Jan. 9, 2007

(54) PROCESS FOR MANUFACTURE OF POLYTRIMETHYLENE ETHER GLYCOL

(75) Inventors: Hari Babu Sunkara, Hockessin, DE (US); Howard C. Ng, Kingston (CA); Wei Zheng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/204,731

(22) Filed: Aug. 16, 2005

(51) Int. Cl.
*C07C 43/11* (2006.01)
*C08J 3/26* (2006.01)

(52) U.S. Cl. .................... 568/619; 524/414; 524/425; 524/433; 524/438; 524/742; 524/745; 524/767; 568/679

(58) Field of Classification Search ............... 524/742, 524/755, 760, 765, 766, 767, 779, 788, 414, 524/425, 433, 438, 745; 528/487, 488, 490, 528/503; 568/852, 853, 854, 886, 619, 679
See application file for complete search history.

(56) References Cited

U.S. PATENT DOCUMENTS

| | | |
|---|---|---|
| 5,015,789 A | 5/1991 | Arntz et al. |
| 5,276,201 A | 1/1994 | Haas et al. |
| 5,284,979 A | 2/1994 | Haas et al. |
| 5,334,778 A | 8/1994 | Haas et al. |
| 5,364,984 A | 11/1994 | Arntz et al. |
| 5,364,987 A | 11/1994 | Haas et al. |
| 5,633,362 A | 5/1997 | Nagarajan et al. |
| 5,686,276 A | 11/1997 | Laffend et al. |
| 5,821,092 A | 10/1998 | Nagarajan et al. |
| 5,962,745 A | 10/1999 | Brossmer et al. |
| 6,140,543 A | 10/2000 | Brossmer et al. |
| 6,232,511 B1 | 5/2001 | Haas et al. |
| 6,235,948 B1 | 5/2001 | Sunkara et al. |
| 6,277,289 B1 | 8/2001 | Kurian et al. |
| 6,284,930 B1 | 9/2001 | Haas et al. |
| 6,297,408 B1 | 10/2001 | Haas et al. |
| 6,331,264 B1 | 12/2001 | Kurian et al. |
| 6,342,646 B1 | 1/2002 | Haas et al. |
| 6,608,168 B1 | 8/2003 | Ng |
| 6,720,459 B1 | 4/2004 | Sunkara et al. |
| 2002/0007043 A1 | 1/2002 | Sunkara et al. |
| 2004/0030095 A1 | 2/2004 | Sunkara et al. |
| 2004/0225161 A1 | 11/2004 | Sunkara et al. |
| 2004/0260125 A1 | 12/2004 | Seapan et al. |
| 2005/0069997 A1 | 3/2005 | Adkesson et al. |
| 2005/0283028 A1 | 12/2005 | Sunkara et al. |

FOREIGN PATENT DOCUMENTS

| | | |
|---|---|---|
| JP | 2004 182974 A | 7/2004 |
| JP | 2004 352713 A | 12/2004 |
| WO | WO 99/01496 A1 | 1/1999 |
| WO | WO 2004/048440 A1 | 6/2004 |
| WO | WO 2004/099110 A1 | 11/2004 |

*Primary Examiner*—Samuel A. Acquah
(74) *Attorney, Agent, or Firm*—Mark D. Kuller; Bart E. Lerman

(57) ABSTRACT

A process of manufacture of polytrimethylene ether glycol comprising:

(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;

(b) adding water to the polytrimethylene ether glycol and hydrolyzing the acid esters formed during the polycondensation to form a hydrolyzed mixture containing the polytrimethylene ether glycol and the hydrolyzed acid esters;

(c) adding organic solvent that is miscible with water to the hydrolyzed mixture to form an aqueous-organic mixture comprising (i) organic phase containing polytrimethylene ether glycol and residual acid polycondensation catalyst from the polycondensing and (ii) water phase;

(d) separating the water phase and the organic phase;

(e) adding base to the separated organic phase to neutralize the residual acid polycondensation catalyst by forming salts of the residual acid polycondensation catalyst;

(f) separating the organic phase into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol.

20 Claims, No Drawings

PROCESS FOR MANUFACTURE OF POLYTRIMETHYLENE ETHER GLYCOL

FIELD OF THE INVENTION

The present invention relates to an improved process for purifying polytrimethylene ether glycol.

BACKGROUND OF THE INVENTION

Polytrimethylene ether glycol and its uses have been described in the art. Preferred methods for preparation of polytrimethylene ether glycol involve acid catalyzed polycondensation of 1,3-propanediol. For example, U.S. Pat. No. 6,720,459, which is incorporated herein by reference, discloses a continuous process for preparation of polytrimethylene ether glycol from 1,3-propanediol using a polycondensation catalyst, preferably an acid catalyst.

WO99/01496, which is incorporated herein by reference, discloses a process for the purification of polyethers includes the steps of (a) heating a polyether glycol with water for a time and at temperature sufficient to substantially hydryrolyze esters formed during polymerization, (b) separating the polyether from the water, and (c) subjecting the polyether recovered from step (b) to further washing with hot water to remove residual acid.

US 2002-0007043 A1, which is incorporated herein by reference, describes a purification procedure for crude polytrimethylene ether glycol obtained from an acid catalyzed polymerization process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. It is clear from US 2002-0007043 A1 that when sulfuric acid is used as a catalyst to make polyether glycols from their corresponding diols, it is preferred to include a hydrolysis step because a substantial portion of the acid is converted to the ester, alkyl hydrogen sulfate. These ester groups act as emulsifying agents during the water washing process, thus causing the washing process to be difficult and time consuming, and causing incomplete acid removal. The hydrolysis step is also important in order to obtain polymer with the high dihydroxy functionality required to use the polymer as a reactive intermediate. When the hydrolysis step is incorporated into the process, it is generally found that the phase separation between the water and polytrimethylene ether glycol phases can take a substantial amount of time, e.g. up to about 35–40 hours. Consequently, there is a need for a method to reduce the phase separation time.

JP2004-182974A, which is incorporated herein by reference, discloses a polycondensation process for preparing polyether polyols, including preparing polytrimethylene ether glycol from 1,3-propanediol, utilizing a polycondensation catalyst system that contains both an acid and a base. It is disclosed that the use of this catalyst system produces polyether polyol with high degree of polymerization and low color under mild conditions. The purification process utilizes a hydrolysis step wherein water and organic solvent that has affinity for both water and the polyether polyol are used and subsequent separation into aqueous and organic phases. In one example this patent application discloses use of calcium hydroxide to treat the organic phase after the phase separation. This process also has a disadvantage in that the resulting polyether polyol contains base catalyst residues. Consequently, a process that results in faster phase separation and polyether polyol free from catalyst residues is desired.

SUMMARY OF THE INVENTION

This invention is directed to a process of manufacture of polytrimethylene ether glycol comprising:

(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;

(b) adding water to the polytrimethylene ether glycol and hydrolyzing the acid esters formed during the polycondensation to form a hydrolyzed mixture containing the polytrimethylene ether glycol and the hydrolyzed acid esters;

(c) adding organic solvent that is miscible with water to hydrolyzed mixture to form an aqueous-organic mixture comprising (i) organic phase containing polytrimethylene ether glycol and residual acid polycondensation catalyst from the polycondensing and (ii) water phase;

(d) separating the water phase and the organic phase;

(e) adding base to the separated organic phase to neutralize the residual acid polycondensation catalyst by forming salts of the residual acid polycondensation catalyst;

(f) separating the organic phase into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol.

Preferably the organic solvent is selected from the group consisting of alcohols, ketones and ethers. More preferably the organic solvent is selected from the group consisting of tetrahydrofuran, acetone, methanol, ethanol and mixtures thereof. Most preferably the organic solvent is tetrahydrofuran.

Preferably the organic solvent is added in an amount of about 10 to about 100 wt. %, based on the weight of the reactant. More preferably the organic solvent used is vary from about 15 to about 50 wt. %.

Preferably the hydrolyzing is carried out at about 80 to about 110° C., more preferably at about 90 to about 110° C.

Preferably the hydrolyzing is carried out at about 700 mmHg to about 1600 mmHg.

Preferably the separating the water phase and the organic phase comprises allowing aqueous-organic mixture to stand without agitation at a temperature of about 5 to about 20° C. below the boiling temperature of the organic solvent for a time sufficient for the organic and water phases to separate, and then draining or decanting the water phase.

In a preferred process, the invention is directed to a process of manufacture of polytrimethylene ether glycol comprising:

(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;

(b) adding about 50 to about 100 wt. % water, based on the weight of the polytrimethylene ether glycol, to the polytrimethylene ether glycol and hydrolyzing the acid esters formed during the polycondensing that are in the aqueous-organic mixture at about 80 to about 110° C. at about 700 mmHg to about 1600 mmHg to form a hydrolyzed mixture containing the polytrimethylene ether glycol and the hydrolyzed acid esters;

(c) adding organic solvent that is miscible with water to the hydrolyzed mixture to form an aqueous-organic mixture comprising (i) organic phase containing polytrimethylene ether glycol and residual acid polycondensation catalyst from the polycondensing and (ii) water phase;

(d) separating the water phase and the organic phase;

(e) neutralizing at 50 to 90° C. the residual acid polycondensation catalyst by forming salts of the residual acid polycondensation catalyst by adding base selected from the group consisting of alkaline earth metal hydroxides, alkaline earth metal oxides and alkaline earth metal carbonates, and mixtures thereof, to the separated organic phase to;

(f) separating the organic phase by centrifuging or filtering into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol. Preferably the organic solvent is selected from the group consisting of tetrahydrofuran, acetone, methanol, ethanol and mixtures thereof, and the hydrolyzing is carried out at about 90 to about 110° C. More preferably the separating the water phase and the organic phase comprises allowing aqueous-organic mixture to stand without agitation at a temperature of about 5 to about 20° C. below the boiling temperature of the organic solvent for a time sufficient for the organic and water phases to separate, and then draining or decanting the water phase. Preferably the removing of organic solvent from polymer phase comprises vacuum striping. Preferably the base is selected from the group consisting of calcium hydroxide, calcium oxide, calcium carbonate, magnesium hydroxide, magnesium oxide, magnesium carbonate, barium carbonate, barium oxide, barium hydroxide and mixtures thereof.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

In the context of this disclosure the term "miscible" as applied to mixtures of two or more materials is intended to mean that upon mixing the materials a single phase is formed.

This invention is a method for manufacture of polytrimethylene glycol using an acid polycondensation catalyst. The method includes a novel and improved process for purification of the polytrimethylene ether glycol.

The starting material for the process is reactant comprising at least one of 1,3-propanediol, 1,3-propanediol dimer and 1,3-propanediol trimer, or mixtures thereof. The 1,3-propanediol reactant employed in the process of the present invention may be obtained by any of the various chemical routes or by biochemical transformation routes. Preferred routes are described in U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 6,235,948, 6,277,289, 6,284,930, 6,297,408, 6,331,264 and 6,342,646, and US 2004-0225161 A1, US 2004-0260125 A1 and US 2005-0069997 A1, all of which are incorporated herein by reference in their entireties. Preferably the 1,3-propanediol used as the reactant or as a component of the reactant will have a purity of greater than about 99% by weight as determined by gas chromatographic analysis.

Although any of 1,3-propanediol, and dimers or trimers of 1,3-propanediol can be used as the reactant in the process of the invention, it is preferred that the reactant comprise about 90% or more by weight of 1,3-propanediol. More preferably the reactant will comprise 99% or more by weight of 1,3-propanediol.

The starting material for the present invention may also contain small amounts, preferably no more than about 30%, more preferably no more than about 10%, by weight, of the starting material, of comonomer diols in addition to the reactant 1,3-propanediol or its dimers and trimers without detracting from the efficacy of the process. Examples of preferred comonomer diols include ethylene glycol, 2-methyl-1,3-propanediol, 2,2-dimethyl-1,3 propane diol and $C_6$–$C_{12}$ diols such as 2,2-diethyl-1,3-propanediol, 2-ethyl-2-hydroxymethyl-1,3-propanediol, 1,6-hexanediol, 1,8-octanediol, 1,10-decanediol, 1,12-dodecanediol, 1,4-cyclohexanediol, and 1,4-cyclohexanedimethanol. A more preferred comonomer diol is ethylene glycol. Polytrimethylene ether glycols prepared from 1,3-propanediol and ethylene glycol are described in U.S. Patent Application Publication No. 2004/0030095, which is incorporated herein by reference.

The polytrimethylene ether glycols of this invention can also be prepared using about 10 to about 0.1 mole percent of aliphatic or aromatic diacid or diester, preferably terephthalic acid or dimethyl terephthalate, and most preferably terephthalic acid, as described in detail in U.S. Pat. No. 6,608,168, which is incorporated herein by reference.

Stabilizers (e.g., UV stabilizers, thermal stabilizers, antioxidants, corrosion inhibitors, etc.), viscosity boosters, antimicrobial additives, and coloring materials (e.g., dyes, pigments, etc.) may be added to the polymerization mixture or final product if necessary.

Any acid catalyst suitable for acid catalyzed polycondensation of 1,3-propanediol may be used in present process. Preferred acid polycondensation catalysts are described in U.S. Published Patent Application No. 2002/0007043 A1 and in U.S. Pat. No. 6,720,459, both of which are incorporated herein by reference. They are preferably selected from the group consisting of Lewis acids, Bronsted acids, super acids, and mixtures thereof, and they include both homogeneous and heterogeneous catalysts. More preferably the catalysts are selected from the group consisting of inorganic acids, organic sulfonic acids, heteropolyacids and metal salts. Most preferably the catalyst is a homogeneous catalyst, preferably selected from the group consisting of sulfuric acid, hydriodic acid, fluorosulfonic acid, phosphorous acid, p-toluenesulfonic acid, benzenesulfonic acid, methanesulfonic acid, phosphotungstic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, and zirconium triflate. The catalyst can also be a heterogeneous catalyst, preferably selected from the group consisting of zeolites, fluorinated alumina, acid-treated alumina, heteropolyacids and heteropolyacids supported on zirconia, titania, alumina and/or silica. The most preferred catalyst is sulfuric acid.

Preferably the polycondensation catalyst is used in an amount of from about 0.1 wt. % to about 3 wt. %, more preferably from about 0.5 wt. % to about 1.5 wt. %, based on the weight of the reactant.

The process of this invention should be carried out without use of a base in the catalyst system, such as the polycondensation catalyst that contains both an acid and a base described in JP2004-182974A, which is incorporated herein by reference.

The polymerization process can be batch, semi-continuous, continuous, etc. A preferred batch process is described in US 2002/0007043 A1, which is incorporated herein by reference. In this embodiment the polytrimethylene-ether glycol is prepared by a process comprising the steps of: (a) providing (1) reactant, and (2) acid polycondensation catalyst; and (b) polycondensing the reactants to form a polytrimethylene ether glycol. The reaction is conducted at an elevated temperature of at least about 150° C., more preferably at least about 160° C., up to about 210° C., more preferably about 200° C. The reaction is preferably conducted either at atmospheric pressure in the presence of inert gas or at reduced pressure (i.e., less than 1 atmosphere), preferably less than about 500 mm Hg in an inert atmosphere and exteremly low pressures can be used (e.g., as low as about 1 mm Hg).

A preferred continuous process for preparation of the polytrimethylene ether glycols of the present invention is described in U.S. Pat. No. 6,720,459, which is incorporated herein by reference. Thus, in this embodiment the polytrimethylene ether glycol is prepared by a continuous process comprising: (a) continuously providing (i) reactant, and (ii) polycondensation catalyst; and (b) continuously polycondensing the reactant to form polytrimethylene ether glycol Regardless of whether the process is a continuous or batch process, or otherwise, when a homogeneous acid catalyst, particularly sulfuric acid, is used, a substantial amount of acid ester is formed from the catalyst. In the case of sulfuric acid, a substantial portion of the acid is converted to the ester, alkyl hydrogen sulfate. It is important to remove these acid esters because they act as emulsifying agents during the water washing used to remove catalyst and therefore cause the washing process to be difficult and time consuming. Moreover, the hydrolysis step is also important in order to obtain polymer with the high dihydroxy functionality required to use the polymer as a reactive intermediate.

Thus, the next step comprises hydrolyzing the acid esters formed during the polycondensing that are in the aqueous-organic mixture.

The hydrolysis step is preferably carried out by adding water to the polymer. The amount of water added can vary and is preferably from about 10 to about 200 wt. %, more preferably from about 50 to about 100 wt. %, based on the weight of the polytrimethylene ether glycol. Hydrolysis is preferably carried out by heating the aqueous-organic mixture to at a temperature range from about 80 to about 110° C., preferably at about 90 to about 110° C. (preferably about 90 to about 100° C. when carried out at atmospheric pressure), for a period of sufficient time (in the absence of agitation). The hydrolysis step is preferably conducted at atmospheric or slightly above atmospheric pressure, preferably at (about 700 mmHg to about 1600 mmHg. Higher pressures can be used, but are not preferred. The hydrolysis step is carried out preferably under inert gas atmosphere.

The hydrolysis step of the process of this invention is preferably carried out in the absence of an organic solvent.

To the aqueous polytrimethylene ether glycol mixture is added organic solvent that is miscible with water and polytrimethylene ether glycol to form an aqueous-organic mixture comprising (i) organic phase containing polytrimethylene ether glycol and residual acid polycondensation catalyst from the polycondensing and (ii) water phase. Preferable water miscible solvents are chosen from the classes of alcohols, ketones, ethers and mixtures thereof, and preferably have a high enough volatility that they are easily removed under vacuum. Examples of such water-miscible solvents are tetrahydrofuran, acetone, methanol and ethanol, as well as mixtures thereof. Preferred water-miscible solvents are tetrahydrofuran, acetone, methanol and mixtures thereof. The most preferred water-miscible solvent is tetrahydrofuran. The amount of organic solvent used may vary, and is preferably from about 10 to about 100 wt. %, more preferably from about 15 to about 50 wt. %, and even more preferably up to about 30 wt %, based on the weight of the reactant.

It is preferable to reduce the temperature of the reaction mixture (i.e., the polytrimethylene ether glycol) to at least about 5 to 20° C. below boiling temperature of the solvent before addition of the solvent.

The next step comprises separating the water phase and the organic phase. Separation is preferably carried out by allowing the water phase and the organic phase to separate and settle so that the water phase can be removed. The reaction mixture is allowed to stand, preferably without agitation and at a temperature at least about 5° C., and preferably up to 20° C., below the boiling temperature of the organic solvent, until settling and phase separation has occurred. The time required for the separation and settling will be substantially less than that required for a process that is the same except for the omission of the organic solvent.

Prior to this invention it was found that this period of phase separation and settling was protracted. For example, with prior processes it was not unusual for the settling to take as long as 36 hours before the phases separated sufficiently. Using the invention the period for phase separation after hydrolysis is shortened and in batch processes is preferably less than one hour. Preferably this time period is 5 minutes to one hour, most preferably 30 minutes or less.

The next step of the separating the water phase and the organic phase, preferably by decantation or draining. It is advantageous to retain the organic phase in the reactor for subsequent processing. Consequently, when the organic phase is on bottom it is preferably to decant off the aqueous phase and when the organic phase is on top, it is preferred to drain off the aqueous phase.

Following the hydrolysis and phase separation steps base, preferably an insoluble base, is added to neutralize any remaining acid. Residual acid polycondensation catalyst is formed into its corresponding salts.

Preferably, the base is selected from the group consisting of alkaline earth metal hydroxides, alkaline earth metal oxides and alkaline earth metal carbonates. More preferably, the base is selected from the group consisting of calcium hydroxide, calcium oxide, calcium carbonate, magnesium hydroxide, magnesium oxide, magnesium carbonate, barium carbonate, barium oxide and barium hydroxide. Most preferably the base is calcium hydroxide. The base may be added as a dry solid, or preferably as an aqueous slurry. The amount of insoluble base utilized in the neutralization step is preferably at least enough to neutralize all of the acid polycondensation catalyst. More preferably a stoichiometric excess of from about 0.1 wt. % to about 10 wt. % is utilized. The neutralization is preferably carried out at 50 to 90° C. for a period of from 0.1 to 3 hours under nitrogen atmosphere.

Next, the organic phase is separated into (i) liquid phase comprising the polytrimethylene ether glycol, the organic solvent and any residual water, and (ii) solid phase comprising the salts of the residual acid polycondensation catalyst and the base which is unreacted. This is followed by removing the organic solvent and the residual water from the organic phase to obtain polytrimethylene ether glycol. The unreacted base and the neutralization products present in the polymer are preferably removed by filtration or centrifugation, preferably filtration with the help of a filter-aid. Prior to this invention, this separation step was very time consuming. For example, it has been found that filtration would take as long as 9 hours. Surprisingly, it has been found that the present invention provides a novel way of reducing the time required for both the phase separation/settling and filtration steps. For example, addition of such a solvent in a process that required 12 hours for phase separation and settling, reduced that time to only about 30 minutes. Filtration time, after neutralization, was reduced from 7 hours to about 30 minutes.

The organic phase containing the polytrimethylene ether glycol is preferably separated by filtration (preferably with use of filter-aid material) (see, e.g., U.S. patent application Ser. No. 10/871,622, filed Jun. 18, 2004, which is incorporated herein by reference), or centrifugation, to remove the base and the acid/base reaction products by centrifugation or filtration methods well known in the art. For example, filtration under the earth's gravity, centrifugal filtration, or pressure filtration can be used. Filter presses, candle filters, pressure leaf filters or conventional filter papers are also be used for the filtration, which can be carried out batchwise or continuously. Filtration in the presence of a filter-aid is preferred at a temperature range from 50 to 100° C. at a pressure range from 1 to 5 bars. As discussed above, the time required for the filtration will be substantially less than that required for a process that is the same except for the omission of the organic solvent.

The solvent and any residual water are preferably removed from the organic phase by vacuum stripping (e.g., distillation at low pressure), generally with heating, to remove organic solvent, any remaining water, and if desired, unreacted monomeric materials. Other techniques can be used, such as distillation at about atmospheric pressure. The remaining polytrimethylene ether glycol will preferably have a number average molecular weight (Mn) of from about 250 to about 5,000. Mn of 1,000 to 3,000 is preferred for many applications.

The advantages of this novel process in terms of reduction of phase separation time and filtration time have already been discussed. However, there are additional advantages, which although more difficult to quantify, are highly significant. First, previous processes usually require more than one water wash because of the difficulty of phase separation. The processes of the invention, however, usually require only one water wash and consequently minimize the amount of waste water produced. Moreover, the reduced number of water washes minimizes the amount of low molecular weight oligomers lost because of water solubility. Second, the process of the invention eliminates the need for high pressure or reduced pressure during filtration, thus providing energy savings.

The invention is illustrated in the following examples. All parts, percentages, etc., referred to in the examples are by weight unless otherwise indicated.

EXAMPLES

The 1,3-propanediol utilized in the examples was prepared by biological methods described in U.S. patent application Ser. No. 10/839,188, filed May 5, 2004, which is incorporated herein by reference and had a purity of >99.8%

Comparative Example

This example describes preparation of polytrimethylene ether glycol ($M_n$ of about 2000) without the use of added solvent, for comparison with the following examples that utilize solvent according to the invention.

1,3-Propanediol (11.9 kg) and 108 g of sulfuric acid were charged into a 22 L glass flask and then heated at 166+/−1° C. under nitrogen for 24 hours to produce polytrimethylene ether glycol. During the reaction, by-product water was removed by nitrogen sparging.

After the 24-hour heating period, 8 kg of de-ionized water was added and the resulting aqueous mixture was held at 95° C. for 4 hours under nitrogen to hydrolyze the acid ester formed during the acid catalyzed polycondensation.

After hydrolysis, the reaction mixture was cooled to 60° C. and allowed to stand for phase separation. About 12 hours were required for separation into two phases, the bottom layer being the organic phase and the top layer the aqueous phase.

The organic phase was transferred into a rotary-evaporator. The material of the organic phase was analyzed by titration to determine the amount of base necessary for neutralization of the residual acid, and 0.5 g of calcium hydroxide was added. The resulting mixture was stirred at 70° C. for 1 hour.

After neutralization, the temperature was increased to 90° C. and held for 3 hours at 10 mm of Hg to remove residual water. After drying, the mixture was filtered under 15 psig nitrogen to obtain the purified polytrimethylene ether. Filtration time was about 7 hours.

Example 1

This example describes preparation of polytrimethylene ether glycol utilizing tetrahydrofuran as added water-miscible solvent.

1,3-Propanediol (11.9 kg) and 108 g of sulfuric acid were charged into a 22 L glass flask and then heated at 166+/−1° C. under nitrogen for 24 hours to produce polytrimethylene ether glycol. During the reaction by-product water was removed by nitrogen sparging.

After the 24-hour heating period, 4 kg of de-ionized water was added and the resulting aqueous mixture was held at 95° C. for 4 hours under nitrogen to hydrolyze the acid ester formed during the acid catalyzed polycondensation.

The hydrolyzed reaction mixture was cooled to 60° C., and then 2.6 kg of tetrahydrofuran was added followed by mixing for 10 min. At the end of this time agitation was stopped and the mixture was allowed to stand for phase separation. The time required for separation into two phases was 20–30 minutes. The organic phase (top layer) was titrated with base to determine the amount of base required for neutralization of residual acid, and 3.53 g of calcium hydroxide was added, and then the resulting mixture was stirred at 60° C. for 1 hour. After neutralization, the mixture was filtered at 15 psig nitrogen to remove solids (filtration time: 0.5 hour), and then the organic phase was heated in a rotary-evaporator at 90° C. for 3 hour drying at 10 mm of Hg to remove the residual water and tetrahydrofuran and obtain purified polytrimethylene ether glycol.

Example 2

This example describes preparation of polytrimethylene ether glycol utilizing acetone as added water-miscible solvent.

Polymerization and hydrolysis of 1,3-propanediol were carried out as described above for Example 1.

The hydrolyzed reaction mixture was cooled to 50° C., and then 2.6 kg of acetone was added, and the resulting mixture was stirred for 10 min. Then the stirring was stopped. It then took about 30–40 minutes for the mixture to separate into two phases, the organic phase at the bottom and the aqueous phase at the top. The aqueous phase was separated and discarded.

Based on results from titration of a sample of the organic layer, 5.06 g of calcium hydroxide was added to the organic phase to neutralize the residual acid catalyst, and the resulting mixture was stirred at 50° C. for 1 hour.

After neutralization, the mixture was filtered at 15 psig nitrogen to remove solids (filtration time: 0.5 hour), and then the organic phase was heated in a rotary-evaporator at 90° C. for 3 hour drying at 10 mm of Hg to remove the residual water and acetone and obtain purified polytrimethylene ether glycol.

Example 3

This example describes preparation of polytrimethylene ether glycol utilizing methanol as added water-miscible solvent.

1,3-Propanediol (595 g) and 5.4 g of sulfuric acid were charged into a 1 L glass flask. The stirred contents of the flask were heated to 166+/−1° C. under nitrogen and held at that temperature for 24 hours to produce polytrimethylene ether glycol. During reaction, by-product, water, was removed by nitrogen sparging. Then 200 g of de-ionized water was added into the flask and the resulting mixture was held at 95° C. for 4 hours under nitrogen to hydrolyze the acid ester formed during the acid catalyzed polycondensation.

The hydrolyzed reaction mixture was cooled to 60° C., and then 130 g of methanol was added into the flask and mixed followed by stirring for 10 minutes. After 10 min, the agitation was stopped. About 15 minutes were required for the mixture to separates into two phases, the organic phase at bottom and the aqueous at the top layer.

Based on titration of a sample of the bottom layer, 0.2 g of calcium hydroxide was added into the organic phase to neutralize the residual acid catalyst, and the resulting mixture was stirred at 60° C. for 1 hour.

After neutralization, the mixture was filtered at 15 psig nitrogen to remove solids, and then it was heated at 90° C. for 3 hour at 10 mm of Hg in a rotary-evaporator and to remove the residual water and methanol and obtain purified polytrimethylene ether glycol.

TABLE 1

| Solvent | Phase Separation time, hr | Filtration time, hr | $M_n$ | Overall Yield, % |
|---|---|---|---|---|
| Comp. Ex. 1 | None | 12 | 7 | 2000 | 72 |
| Example 1 | Tetrahydrofuran | 0.5 | 0.5 | 1847 | 81 |
| Example 2 | Acetone | 0.5 | 0.5 | 1895 | 78 |
| Example 3 | Methanol | 0.25 | 0.2 | 1921 | 76 |

The data in Table 1 shows that the addition of solvent dramatically reduces the phase separation and filtration times while having no substantial effect on the properties of the polytrimethylene ether glycol.

What is claimed is:

1. A process of manufacture of polytrimethylene ether glycol comprising:
   (a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;
   (b) adding water to the polytrimethylene ether glycol and hydrolyzing the acid esters formed during the polycondensation to form a hydrolyzed mixture containing the polytrimethylene ether glycol and the hydrolyzed acid esters;
   (c) adding organic solvent that is miscible with water to the hydrolyzed mixture to form an aqueous-organic mixture comprising (i) organic phase containing polytrimethylene ether glycol and residual acid polycondensation catalyst from the polycondensing and (ii) water phase;

(d) separating the water phase and the organic phase;

(e) adding base to the separated organic phase to neutralize the residual acid polycondensation catalyst by forming salts of the residual acid polycondensation catalyst;

(f) separating the organic phase into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol.

2. The process of claim 1 wherein the organic solvent is selected from the group consisting of alcohols, ketones and ethers.

3. The process of claim 1 wherein the organic solvent is selected from the group consisting of tetrahydrofuran, acetone, methanol, ethanol and mixtures thereof.

4. The process of claim 1 wherein the organic solvent is tetrahydrofuran.

5. The process of claim 1 wherein the organic solvent is added in an amount of about 10 to about 100 wt. %, based on the weight of the reactant.

6. The process of claim 2 wherein the organic solvent is added in an amount of about 10 to about 100 wt. %, based on the weight of the reactant.

7. The process of claim 1 wherein the organic solvent used is from about 15 to about 50 wt. %.

8. The process of claim 1 wherein the hydrolyzing is carried out at about 80 to about 110° C.

9. The process of claim 1 wherein the hydrolyzing is carried out at about 90 to about 110° C.

10. The process of claim 1 wherein the hydrolyzing is carried out at about 700 mmHg to about 1600 mmHg.

11. The process of claim 1 wherein the hydrolyzing is carried out at about 700 mmHg to about 1600 mmHg in an inert atmosphere.

12. The process of claim 1 wherein the adding water to the polytrimethylene ether glycol is carried out by adding about 10 to about 200 wt. % water, based on the weight of the polytrimethylene ether glycol.

13. The process of claim 8 wherein the hydrolyzing is carried out at about 700 mmHg to about 1600 mmHg in an inert atmosphere.

14. The process of claim 2 wherein the base is selected from the group consisting of calcium hydroxide, calcium oxide, calcium carbonate, magnesium hydroxide, magnesium oxide, magnesium carbonate, barium carbonate, barium oxide and barium hydroxide.

15. The process of claim 1 wherein the separating the water phase and the organic phase comprises allowing aqueous-organic mixture to stand without agitation at a temperature of about 5 to about 20° C. below the boiling temperature of the organic solvent for a time sufficient for the organic and water phases to separate, and then draining or decanting the water phase.

16. A process of manufacture of polytrimethylene ether glycol comprising:

(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;

(b) adding about 50 to about 100 wt. % water, based on the weight of the polytrimethylene ether glycol, to the polytrimethylene ether glycol and hydrolyzing the acid esters formed during the polycondensing that are in the aqueous-organic mixture at about 80 to about 110° C. at about 700 mmHg to about 1600 mmHg to form a hydrolyzed mixture containing the polytrimethylene ether glycol and the hydrolyzed acid esters;

(c) adding about 10 to about 100 wt. %, based on the weight of the reactant, organic solvent that is miscible with water and polytrimethylene ether glycol selected from the group consisting of alcohols, ketones and ethers to the hydrolyzed mixture to form an aqueous-organic mixture comprising (i) organic phase containing polytrimethylene ether glycol and residual acid polycondensation catalyst from the polycondensing and (ii) water phase;

(d) separating the water phase and the organic phase;

(e) neutralizing at 50 to 90° C. the residual acid polycondensation catalyst by forming salts of the residual acid polycondensation catalyst by adding base selected from the group consisting of alkaline earth metal hydroxides, alkaline earth metal oxides and alkaline earth metal carbonates, and mixtures thereof, to the separated organic phase to;

(f) separating the organic phase by centrifuging or filtering into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol.

17. The process of claim 16 wherein the organic solvent is selected from the group consisting of tetrahydrofuran, acetone, methanol, ethanol and mixtures thereof, and the hydrolyzing is carried out at about 90 to about 110° C.

18. The process of claim 13 wherein the separating the water phase and the organic phase comprises allowing aqueous-organic mixture to stand without agitation at a temperature of about 5 to about 20° C. below the boiling temperature of the organic solvent for a time sufficient for the organic and water phases to separate, and then draining or decanting the water phase.

19. The process of claim 18 wherein the removing comprises vacuum striping.

20. The process of claim 18 wherein the base is selected from the group consisting of calcium hydroxide, calcium oxide, calcium carbonate, magnesium hydroxide, magnesium oxide, magnesium carbonate, barium carbonate, barium oxide and barium hydroxide.

* * * * *